US012562195B2

(12) United States Patent
Chavanke et al.

(10) Patent No.: US 12,562,195 B2
(45) Date of Patent: Feb. 24, 2026

(54) SYSTEM AND METHOD FOR REFERENCING MEDIA USING CONTENT-BASED TIMESTAMPS

(71) Applicant: JIO PLATFORMS LIMITED, Ahmedabad (IN)

(72) Inventors: Nikhil Rangnath Chavanke, Nashik (IN); Krishnam Vajra, Hyderabad (IN); Prassanita Santosh, Mumbai (IN); Gaurav Duggal, Hyderabad (IN); Nutan Chokkareddy, Hyderabad (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/861,303

(22) PCT Filed: Apr. 29, 2023

(86) PCT No.: PCT/IB2023/054491
§ 371 (c)(1),
(2) Date: Oct. 29, 2024

(87) PCT Pub. No.: WO2023/209690
PCT Pub. Date: Nov. 2, 2023

(65) Prior Publication Data
US 2025/0285650 A1     Sep. 11, 2025

(30) Foreign Application Priority Data
Apr. 29, 2022     (IN) .............................. 202221025308

(51) Int. Cl.
*G11B 27/34*        (2006.01)
*G06V 10/74*        (2022.01)
(Continued)

(52) U.S. Cl.
CPC ............ *G11B 27/34* (2013.01); *G06V 10/761* (2022.01); *G06V 10/764* (2022.01); *G06V 20/47* (2022.01); *G06V 20/70* (2022.01); *G10L 25/57* (2013.01)

(58) Field of Classification Search
CPC ........ G11B 27/34; G06V 20/70; G06V 20/47; G06V 10/761; G06V 10/764; G10L 25/05
See application file for complete search history.

(56) References Cited

U.S. PATENT DOCUMENTS

| | | | |
|---|---|---|---|
| 2009/0150147 A1* | 6/2009 | Jacoby | G10L 15/26 |
| | | | 704/235 |
| 2019/0096438 A1* | 3/2019 | Shafir Nir | G11B 27/036 |
| 2020/0166670 A1* | 5/2020 | Zass | G06V 20/40 |

FOREIGN PATENT DOCUMENTS

| | | |
|---|---|---|
| WO | 2019229861 A1 | 12/2019 |
| WO | 2020060638 A1 | 3/2020 |

OTHER PUBLICATIONS

International Search Report and Written Opinion for WIPO application No. PCT/PCT/IB2023/054491, dated Jul. 31, 2023, 9 pages.

* cited by examiner

*Primary Examiner* — Thai Q Tran
*Assistant Examiner* — Jose M Mesa
(74) *Attorney, Agent, or Firm* — FINNEGAN, HENDERSON, FARABOW, GARRETT & DUNNER, LLP

(57) ABSTRACT

The present disclosure provides a system and a method for referencing media/recording using content-based timestamps. The system enables proper documenting of a recording based on visual pixel changes and semantic changes in a slide or a conversation respectively. The system generates timestamps where the timestamps are pointers to the locations in the recording when a new topic is started. The (Continued)

system divides the recording into sections based on the timestamps. Further, the system generates labels for the timestamps along with a transcript for the whole recording that would enable a user to jump to a point of interest in the recording. Hence, the system saves user's time and ensures proper documentation of the recording.

16 Claims, 6 Drawing Sheets

(51) Int. Cl.
    *G06V 10/764*      (2022.01)
    *G06V 20/40*       (2022.01)
    *G06V 20/70*       (2022.01)
    *G10L 25/57*       (2013.01)

100

SYSTEM AND METHOD FOR REFERENCING MEDIA USING CONTENT-BASED TIMESTAMPS

RESERVATION OF RIGHTS

FIELD OF INVENTION

The embodiments of the present disclosure generally relate to systems and methods for referencing business/technical presentations in an online setting. More particularly, the present disclosure relates to a system and a method for referencing media using content-based time stamps.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Business commercialization and technological advancement have led to online business presentations which provide strategic solutions. Based on a requirement, many a times there is a need to refer to the discussion again or to document the discussion presented by a user. Currently, there are solutions for providing the transcript of the business presentations. However, going through the transcript is quite tedious. Further, complexities arise while referencing various discussions due to the lack of annotation/summary provided for the discussions.

There is, therefore, a need in the art to provide a system and a method that can mitigate the problems associated with the prior arts.

OBJECTS OF THE INVENTION

Some of the objects of the present disclosure, which at least one embodiment herein satisfies are listed herein below.

It is an object of the present disclosure to provide systems and methods for efficient summarization of online conference meetings.

It is an object of the present disclosure to provide a system and a method that enables proper documenting of a business meeting call/recording based on visual pixel changes and semantic changes in a slide or a conversation respectively.

It is an object of the present disclosure to provide a system and a method that provides timestamps with a media presentation/recording where timestamps are pointers to the locations in the recording when a new topic is started.

It is an object of the present disclosure to provide a system and a method that divides the media presentation/recording into sections based on the timestamps.

It is an object of the present disclosure to provide a system and a method that generates labels for the timestamps which would act as a summary of a section ahead of the particular timestamp.

It is an object of the present disclosure to provide a system and a method that generates a transcript of the media presentation/recording, which would enable the user to directly jump to a point of interest in the recording.

It is an object of the present disclosure to provide a system and a method that generates a proper documentation of a business meeting/recording, thus saving user's time.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for generating content-based timestamps. The system may include a processor operatively coupled with a memory that stores instructions to be executed by the processor. The processor may receive a set of images via a computing device. The computing device may be operated by a user and may be connected to the processor via a network. The received set of images may be based on a recorded input. The processor may determine a visual variation between at least two images of the set of images and enable a timestamp on each image of the at least two images based on the recorded input. The processor may integrate at least an audio frame with an image of the at least two images based on the visual variation exceeding a threshold value. The processor may map a text in said at least audio frame based on the integration of the at least audio frame with the image to generate a transcript. The processor may encode the transcript with a plurality of time stamps and determine a correlation between one or more sections in the encoded transcript.

In an embodiment, the processor may be configured to determine the correlation between the one or more sections and generate one or more vectors using one or more primary techniques.

In an embodiment, the processor may be configured to use a cosine similarity technique as the one or more primary techniques and merge the one or more sections based on the generated one or more vectors.

In an embodiment, the processor may be configured to generate a text summary based on the merged one or more sections and label the merged one or more sections with the plurality of timestamps.

In an embodiment, the processor may be configured to generate the transcript using one or more secondary techniques.

In an embodiment, the secondary techniques may include at least one of a dynamic time warping (DTW) or an automatic speech recognition (ASR) technique.

In an embodiment, the processor may be configured to compute a Euclidean distance at corresponding locations in the at least two images and determine the visual variation based on the computed Euclidean distance.

In an embodiment, the processor may be configured to encode the transcript via at least one of a document to vector (Doc2Vec) technique and a word to vector (Word2Vec) technique.

In an aspect, the present disclosure relates to a method for generating content-based time stamps. The method may include receiving, by a processor, a set of images via a computing device. The received set of images may be based on a recorded input. The method may include determining, by the processor, a visual variation between at least two images of the set of images and enabling a timestamp on each image of the at least two images based on the recorded input. The method may include integrating, by the processor, at least an audio frame with an image of the at least two images based on the visual variation exceeding a threshold value. The method may include mapping, by the processor, a text in said audio frame based on the integration of said at least audio frame with the image for generating a transcript. The method may include encoding, by the processor, the transcript with a plurality of time stamps and determining a correlation between one or more sections in the encoded transcript.

In an embodiment, the method may include determining, by the processor, the correlation between the one or more sections and generating one or more vectors using one or more primary techniques.

In an embodiment, the method may include using, by the processor, a cosine similarity technique as the one or more primary techniques and merging the one or more sections based on the generated one or more vectors.

In an embodiment, the method may include generating, by the processor, a text summary based on the merged one or more sections and labelling the merged one or more sections with the plurality of timestamps.

In an embodiment, the method may include generating, by the processor, the transcript using one or more secondary techniques.

In an embodiment, the method may include computing, by the processor, a Euclidean distance at corresponding locations in the at least two images and determining the visual variation based on the computed Euclidean distance.

In an aspect, a user equipment (UE) for generating content-based time stamps may include one or more processors communicatively coupled to a processor in a system. The one or more processors may be coupled with a memory. The memory may store instructions to be executed by the one or more processors that may cause the one or more processors to transmit a set of images to the processor via a network. The processor may be configured to receive the set of images from the UE. The received set of images may be based on a recorded input. The processor may determine a visual variation between at least two images of the set of images and enable a timestamp on each image of the at least two images based on the recorded input. The processor may integrate at least an audio frame with an image of the at least two images based on the visual variation exceeding a threshold value. The processor may map a text in the audio frame based on the integration of said at least audio frame with the image to generate a transcript. The processor may encode the transcript with a plurality of time stamps and determine a correlation between one or more sections in the encoded transcript.

In an aspect, a non-transitory computer readable medium may include a processor with executable instructions that may cause the processor to receive a set of images from a computing device via a network. A user may operate the computing device and the received set of images may be based on a recorded input. The processor may determine a visual variation between at least two images of the set of images and enable a timestamp on each image of the at least two images based on the recorded input. The processor may integrate at least an audio frame with the image based on the visual variation exceeding a threshold value. The processor may map a text in said at least audio frame based on the integration of said at least audio frame with the image to generate a transcript. The processor may encode the transcript with a plurality of time stamps and determine a correlation between one or more sections in the encoded transcript.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings May indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1:
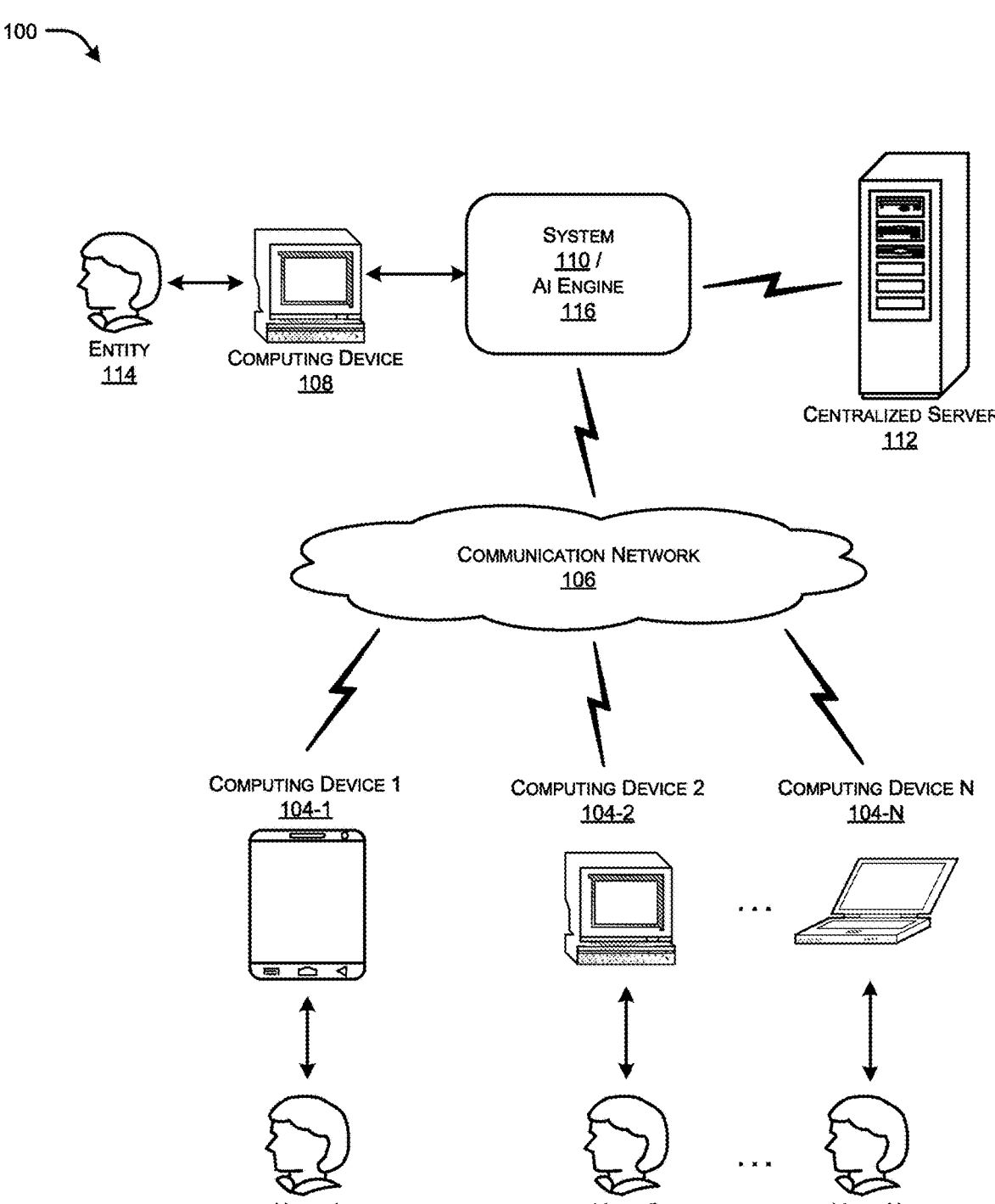
FIG. 1 illustrates an exemplary network architecture (100) of a proposed system (110), in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 1-6.

FIG. 1 illustrates an exemplary network architecture (100) of a proposed system (110), in accordance with an embodiment of the present disclosure.

As illustrated in FIG. 1, the network architecture (100) may include a system (110). The system (110) may be connected to one or more computing devices (104-1, 104-2 . . . 104-N) via a network (106). The one or more computing devices (104-1, 104-2 . . . 104-N) may be interchangeably specified as a user equipment (UE) (104) and be operated by one or more users (102-1, 102-2 . . . 102-N). Further, the one or more users (102-1, 102-2 . . . 102-N) may be interchangeably referred as a user (102) or users (102).

In an embodiment, the computing devices (104) may include, but not be limited to, a mobile, a laptop, etc. Further, the computing devices (104) may include a smartphone, virtual reality (VR) devices, augmented reality (AR) devices, a general-purpose computer, desktop, personal digital assistant, tablet computer, and a mainframe computer. Additionally, input devices for receiving input from the user (102) such as a touch pad, touch-enabled screen, electronic pen, and the like may be used. A person of ordinary skill in the art will appreciate that the computing devices (104) may not be restricted to the mentioned devices and various other devices may be used.

In an embodiment, the network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (106) may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In an embodiment, the system (110) may receive a set of images from the user (102) via the computing device (104), where the received set of images may be based on a recorded input. The recorded input may include at least two video frames as two images. In an embodiment, the system (110) may determine a visual variation between at least two images of the set of images and enable a timestamp on each image of the at least two images.

In an embodiment, the system (110) may evaluate a change as an average Euclidean distance between two pixels on corresponding locations in the at least two images. Further, the system (110) may compute the Euclidean distance at corresponding locations in the at least two images and determine the visual variation.

$$\nabla_{PQ} = \frac{1}{WH} \sum_{i,j} \|p_{ij} - Q_{ij}\|$$

where $P_{ij}$ is the pixel intensity of i, j pixel in P image in red, green, and blue (rgb) space and $Q_{ij}$ is the pixel intensity of i, j pixel in Q image in the rgb space.

In an embodiment, the system (110) may integrate at least an audio frame with an image of the at least two images based on the visual variation exceeding a threshold value. If the visual variation is greater than the threshold value which may be configured after implementing the PoC, then the system (110) may consider the timeframe as a candidate for the timestamp. Further, a plurality of audio frames may be provided from an audio file via a speech-to-text (STT) model. The STT model may output a transcript for the recording where the timestamp locations may be filtered and curated using the transcript.

In an embodiment, the recorded input may include, but not limited to, a business meeting and a call recording provided by the user (102).

Further, in an embodiment, the system (110) may map a text in the audio frame with the image based on the integration of the audio frame with the image to generate the transcript. The transcript along with the plurality of time stamps may be generated by the system (110) using one or more secondary techniques. The secondary techniques may include, but not be limited to, a dynamic time warping (DTW) or an automatic speech recognition (ASR). A person of ordinary skill in the art will understand that DTW may refer to a technique for measuring similarity between two temporal sequences, which may vary in speed. For example, the DTW technique may measure accelerations and decelerations during an observation. The DTW technique may be applied to temporal sequences of video, audio, and graphics data. Further, ASR technique may be a part of natural language processing (NLP). The ASR technique may allow individuals to use their voices with a computer interface such that real conversations may be allowed between individuals and machine intelligence.

In an embodiment, the system (110) may configure the alignment between the timeframes and the sentences in the transcript. Once the timestamps are at the edges of a sentence, the system (110) may partition the transcript at these points to produce one or more adjacent section/ sections and generate separate transcripts for each section between the two timestamps. The system (110) may further utilize the timestamps from the images. Now, for a given timestamp, the system (110) may derive that a specific sentence was spoken at a particular time instance. In an embodiment, if multiple timestamps exist in the duration of a single sentence, then the system (110) may remove duplicates and retain a single copy from the duplicates.

In an embodiment, the system (110) may encode the transcript with a plurality of timestamps and determine a correlation between one or more sections in the transcript. The system (110) may encode the transcript via at least one of a document to vector (Doc2Vec) technique and a word to vector (Word2Vec) technique. A person of ordinary skill in the art will understand that Doc2Vec technique may be an NLP tool for representing documents as a vector The Doc2Vec technique may create a numeric representation of a document, irrespective of its length. Further, Word2Vec technique may be a two-layer neural net that processes text using a text corpus. Further, the Word2Vec technique may output a set of vectors that includes feature vectors representing words from the text corpus.

Further, the system (110) may evaluate a correlation of text content between the generated transcripts to map a visual change with a corresponding change in the audio frame. In an embodiment, the system (110) may determine the correlation between the one or more sections and generate one or more vectors using one or more primary techniques. The system (110) may use a cosine similarity technique as the one or more primary techniques and merge the one or more sections based on the generated one or more vectors.

In an embodiment, the system (110) may generate a text summary based on the merged one or more sections and label the merged one or more sections with the plurality of timestamps. In an embodiment, the system (110) may utilize a summarizer model to generate the text-based summary.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2:
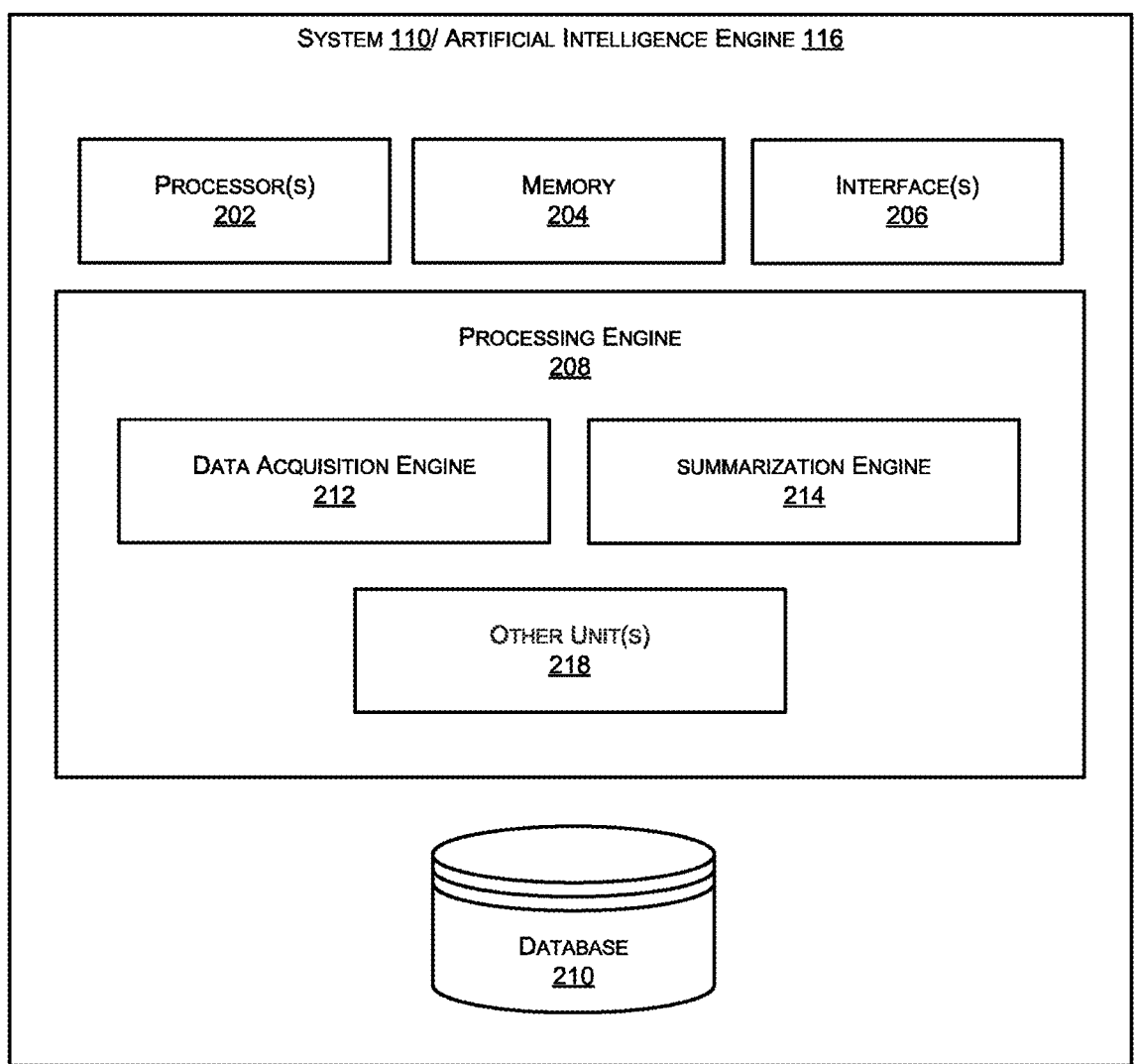
FIG. 2 illustrates an exemplary block diagram (200) of a proposed system (110), in accordance with an embodiment of the present disclosure.

FIG. 2 illustrates an exemplary block diagram (200) of a proposed system (110), in accordance with an embodiment of the present disclosure.

Referring to FIG. 2, the system (110) may comprise one or more processor(s) (202) that may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as random-access memory (RAM), or non-volatile memory such as erasable programmable read only memory (EPROM), flash memory, and the like.

In an embodiment, the system (110) may include an interface(s) (206). The interface(s) (206) may comprise a variety of interfaces, for example, interfaces for data input and output (I/O) devices, storage devices, and the like. The interface(s) (206) may also provide a communication pathway for one or more components of the system (110). Examples of such components include, but are not limited to, processing engine(s) (208) and a database (210), where the processing engine(s) (208) may include, but not be limited to, a data acquisition engine (212) and a summarization engine (214).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

In an embodiment, the processor (202) may utilize the data acquisition engine (212) to receive a set of images via a computing device (104). The processor (202) may store the received set of images in the database (210). The received set of images may be based on a recorded input. The processor (202) may determine a visual variation between at least two images of the set of images and enable a timestamp on each image of the at least two images based on the recorded input. The processor (202) may be configured to compute a Euclidean distance at corresponding locations in the at least two images and determine the visual variation based on the computed Euclidean distance.

In an embodiment, the processor (202) may integrate at least an audio frame with an image of the at least two images based on the visual variation exceeding a threshold value.

In an embodiment, the processor (202) may map a text in the audio frame based on the integration of the at least audio frame with the image to generate a transcript. The processor (202) may generate the transcript with a plurality of time stamps using one or more secondary techniques. The secondary techniques may include, but not limited to, DTW or ASR.

In an embodiment, the processor (202) may utilize the summarization engine (214) and encode the transcript with the plurality of time stamps. Further, the processor (202) may determine a correlation between one or more sections in the transcript. Further, the processor (202) may encode the transcript via at least one of Doc2Vec technique and Word2Vec technique. In an embodiment, processor (202) may be configured to determine the correlation between the one or more sections and generate one or more vectors using one or more primary techniques.

The processor (202) may compute the correlation between the generated one or more vectors using a cosine similarity technique and merge the one or more sections based on the generated one or more vectors.

In an embodiment, the processor (202) may be configured to generate a text summary based on the merged one or more sections and label the merged one or more sections with the plurality of timestamps.

Figure 3:
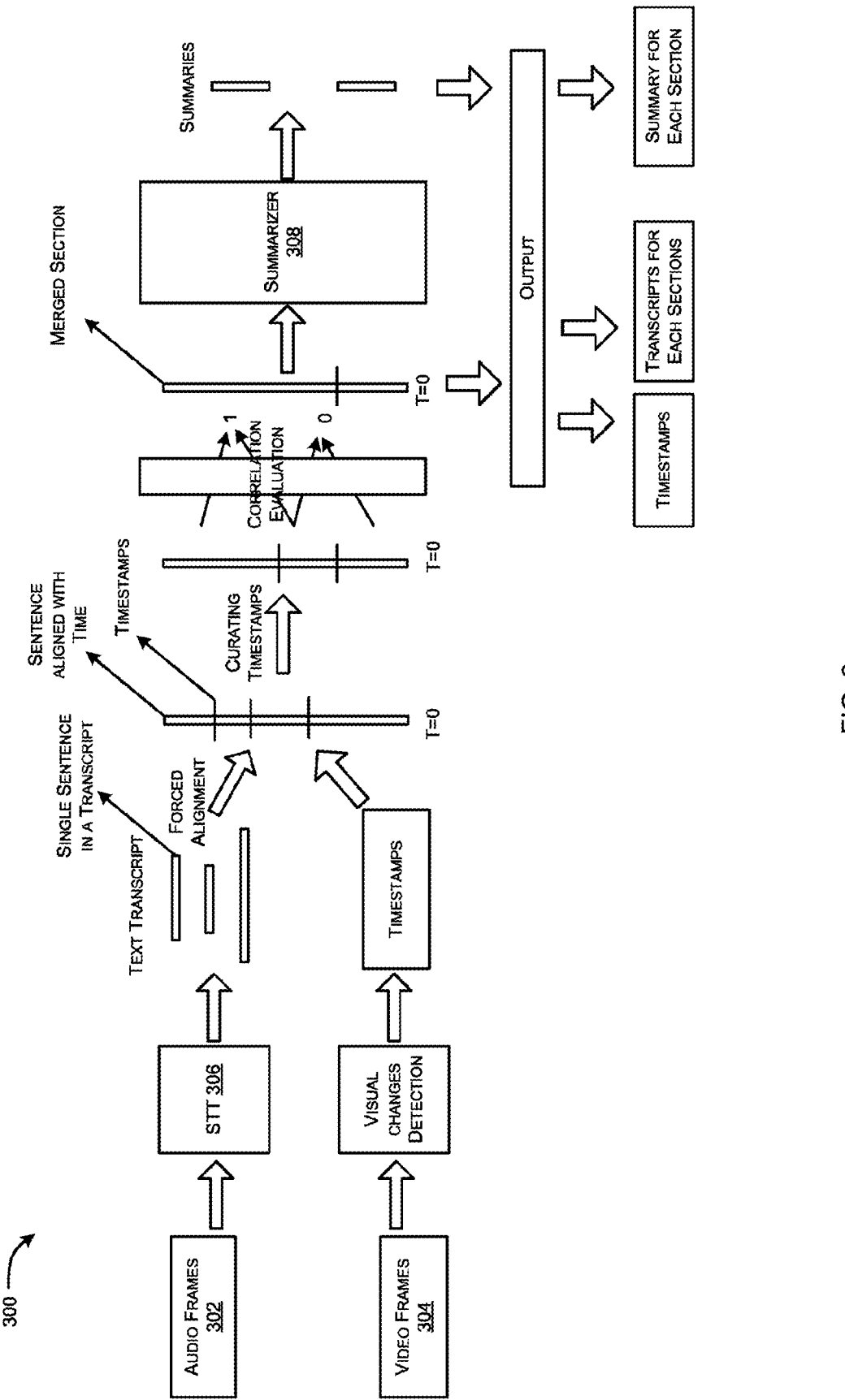
FIG. 3 illustrates an exemplary architecture (300) for implementing the system (110), in accordance with an embodiment of the present disclosure.

FIG. 3 illustrates an exemplary system architecture (300) for implementing the system (110), in accordance with an embodiment of the present disclosure.

As illustrated in FIG. 3, multiple audio frames (302) and multiple video frames (304) may be provided as inputs to the system (110). The multiple audio frames (302) may be processed using an STT module (306). The multiple video frames (304) may be processed using a visual changes detection module (308), where the multiple video frames (304) may be embedded with corresponding timestamps (310). The STT module (306) may generate multiple text transcripts from the multiple audio frames (302) and enable a forced alignment of the plurality of text transcripts with the corresponding timestamps (310). Further, the system (110) may curate the generated timestamps (310) and provide the outputs from the STT module (306) and the visual changes detection module (308) to a correlation evaluation module (312). The correlation evaluation module (312) may generate multiple merged sections (314) based on the outputs from the STT module (306) and the visual changes detection module (308). Further, the system (110) may utilize a summarizer module (316) to generate summaries (318) from the multiple merged sections (314) and provide the summaries (318) via an output module (320). Hence, the output module (320) may include summary for each section (322), timestamps for each section (324), and the corresponding timestamps (326).

In an embodiment, two adjacent sections may be provided to the system (110), where the system (110) may group the sections which may be similar in content i.e. which talk about the same topic. The system (110) may generate two vectors corresponding to the two adjacent sections. The system (110) may use the cosine similarity technique and compare the two vectors to determine a similarity between discussions in two adjacent sections. Based on the similarity of the two adjacent sections, i.e., outputs from the STT module (306) and the visual changes detection module (308), the system (110) may merge the two adjacent sections via the correlation evaluation module (312). The system (110) may generate a single section including a single transcript with the corresponding single timestamp.

In an embodiment, the summarizer module (316) may be configured with an encoder-decoder architecture. The encoder may receive a tokenized input sequence and compute the hidden states. At each time step, a new token may be read and the hidden states may be updated with new information. The encoder may generate an encoder vector based on the computed hidden states.

In an embodiment, the decoder may receive the encoder vector from the encoder and generate words with the available vocabulary. The decoder may generate a first decoder hidden state while outputting a summary sequence including the summaries (318). At each step, the decoder may receive the encoder hidden states and utilize a previous decoder output as its input to compute the decoder hidden states. The decoder may select a new token as this step's decoder output and initialize the new token to generate an output via the summarizer module (316).

Figure 4:
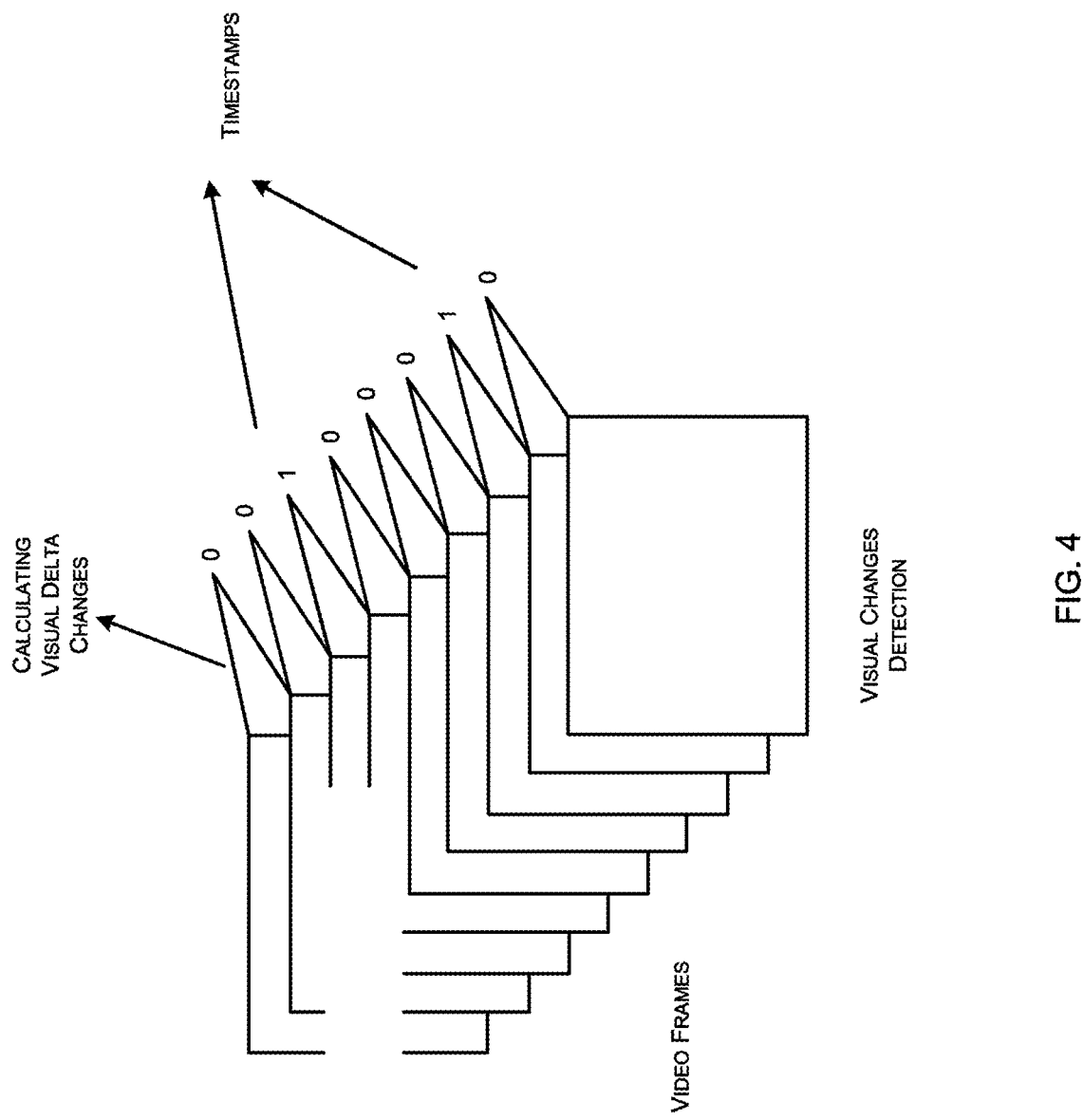
FIG. 4 illustrates an exemplary visual change detection representation (400), in accordance with an embodiment of the present disclosure.

FIG. 4 illustrates an exemplary visual change detection representation (400), in accordance with an embodiment of the present disclosure.

As illustrated in FIG. 4, the system (110) may compute a visual change detection based on multiple video frames provided as input. The system (110) may compute visual delta changes associated with multiple video frames where the visual delta changes may be embedded with the corresponding timestamps.

Figure 5:
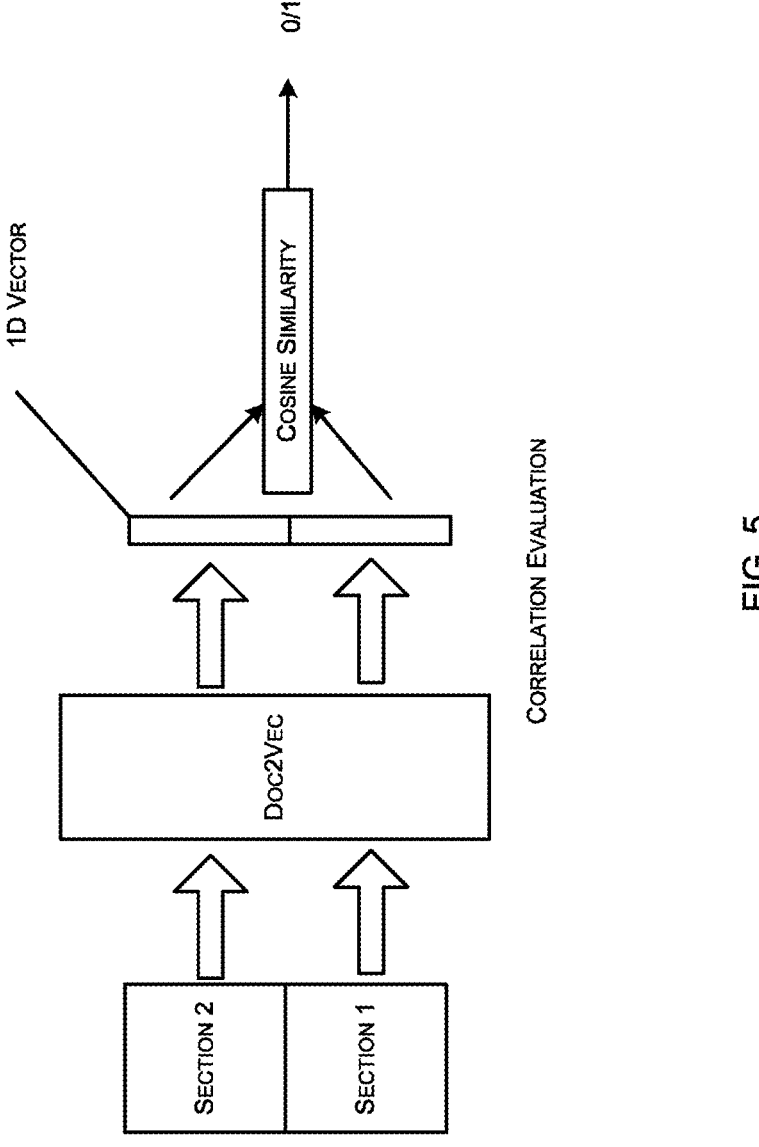
FIG. 5 illustrates an exemplary correlation evaluation (500) of the system (110), in accordance with an embodiment of the present disclosure.

FIG. 5 illustrates an exemplary correlation evaluation (500), in accordance with an embodiment of the present disclosure.

As illustrated in FIG. 5, correlation of text content between two adjacent sections may be evaluated by the system (110) to map the visual change from the visual frames with the corresponding change in topic. A Doc2Vec module (504) may utilize the section 1 and section 2 (502) as inputs to generate a one-dimensional (1D) vector (506) using the cosine similarity technique.

In an embodiment, if the cosine similarity is significantly high as compared to the cosine similarity of adjacent sections, then the section 1 and the section 2 may be merged into a single 1D section. Hence, by processing various sections, a sectioning of the video frames and their corresponding timestamps may be generated.

Figure 6:
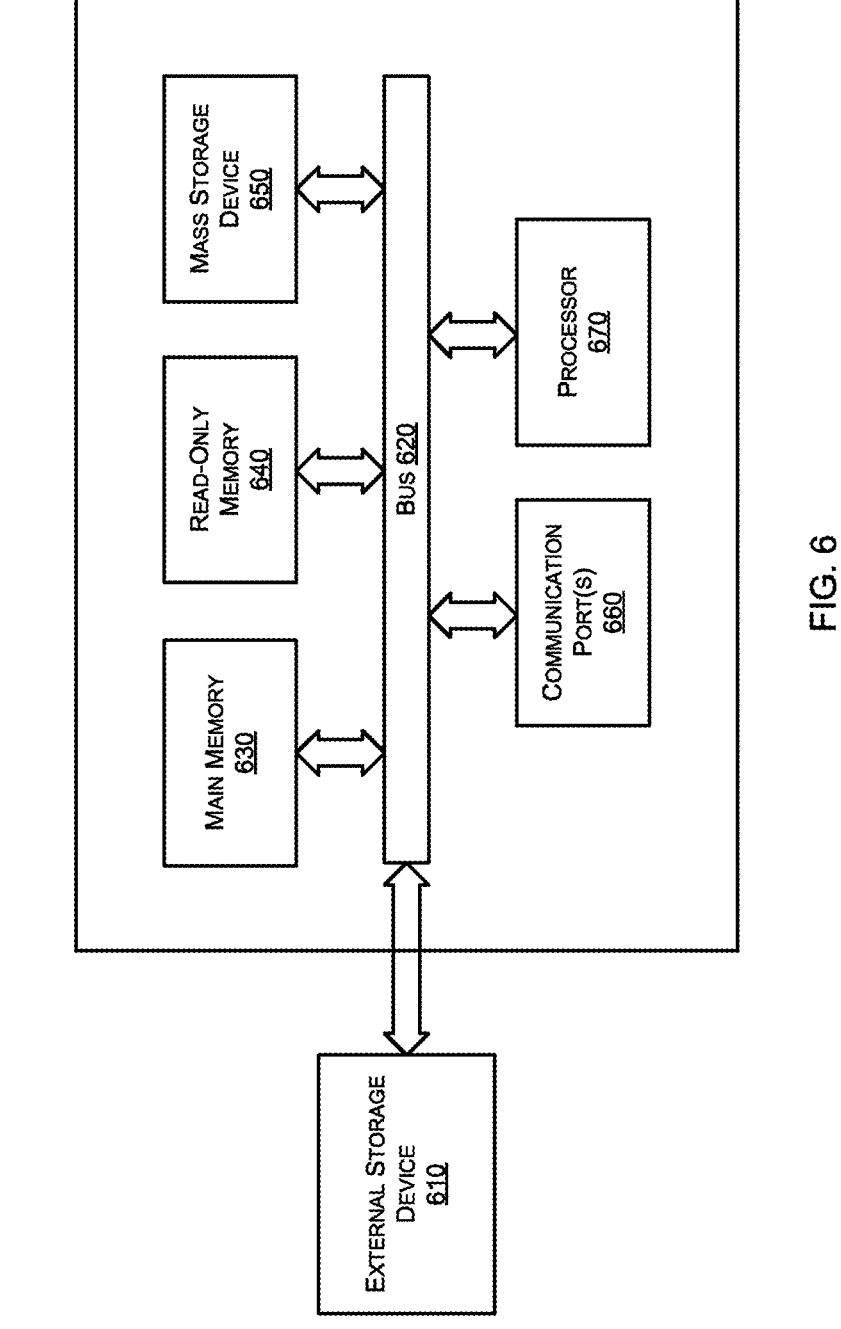
FIG. 6 illustrates an exemplary computer system (600) in which or with which embodiments of the present disclosure may be implemented.

FIG. 6 illustrates an exemplary computer system (600) in which or with which the proposed system may be implemented. In an embodiment, the system (110) may be implemented as the computer system (600).

As shown in FIG. 6, the computer system (600) may include an external storage device (610), a bus (620), a main memory (630), a read-only memory (640), a mass storage device (650), a communication port(s) (660), and a processor (670). A person skilled in the art will appreciate that the computer system (600) may include more than one processor and communication ports. The processor (670) may include various modules associated with embodiments of the present disclosure. The communication port(s) (660) may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) (660) may be chosen depending on a network, such as a Local Area Network (LAN), Wide Area Network (WAN), or any network to which the computer system (600) connects.

In an embodiment, the main memory (630) may be Random Access Memory (RAM), or any other dynamic storage device commonly known in the art. The read-only memory (640) may be any static storage device(s) e.g., but not limited to, a Programmable Read Only Memory (PROM) chip for storing static information e.g., start-up or basic input/output system (BIOS) instructions for the processor (670). The mass storage device (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus (620) may communicatively couple the processor(s) (670) with the other memory, storage, and communication blocks. The bus (620) may be, e.g. a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor (670) to the computer system (600).

In another embodiment, operator and administrative interfaces, e.g., a display, keyboard, and cursor control device may also be coupled to the bus (620) to support direct operator interaction with the computer system (600). Other operator and administrative interfaces can be provided through network connections connected through the communication port(s) (660). Components described above are meant only to exemplify various possibilities. In no way should the aforementioned exemplary computer system (600) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system and a method that enables proper documenting of a business meeting call/recording based on visual pixel changes and semantic changes of a slide or a conversation respectively.

The present disclosure provides a system and a method that provides timestamps with a media presentation/recording where timestamps are pointers to the locations in a recording when a new topic is started.

The present disclosure provides a system and a method that divides the media presentation/recording into sections based on the timestamps.

The present disclosure provides a system and a method that generates labels for the timestamps which would act as a summary of a section ahead of the particular timestamp.

The present disclosure provides a system and a method that generates a transcript of the media presentation/recording, which would enable the user to directly jump to a point of interest in the recording.

The present disclosure provides a system and a method that generates a proper documentation of a business meeting/recording, thus saving user's time.

We claim:

1. A system (110) for generating content-based time stamps, the system (110) comprising: a processor (202); and a memory (204) operatively coupled with the processor (202), wherein said memory (204) stores instructions which when executed by the processor (202) causes the processor (202) to: receive a set of images via a computing device (104), wherein the computing device (104) is operated by a user (102) and connected to the processor (202) via a network (106), and wherein the received set of images are based on a recorded input; determine a visual variation between at least two images of the set of images and enable a timestamp on each image of the at least two images based on the recorded input; integrate at least an audio frame with an image of the at least two images based on the visual variation exceeding a threshold value; map a text in said at least audio frame based on the integration of said at least audio frame with the image to generate a transcript; and encode the transcript with a plurality of time stamps and determine a correlation between one or more sections in the encoded transcript.

2. The system (110) as claimed in claim 1, wherein the processor (202) is configured to determine the correlation between the one or more sections and generate one or more vectors using one or more primary techniques.

3. The system (110) as claimed in claim 2, wherein the processor (202) is configured to use a cosine similarity technique as the one or more primary techniques and merge the one or more sections based on the generated one or more vectors.

4. The system (110) as claimed in claim 3, wherein the processor (202) is configured to generate a text summary based on the merged one or more sections and label the merged one or more sections with the plurality of timestamps.

5. The system (110) as claimed in claim 1, wherein the processor (202) is configured to generate the transcript using one or more secondary techniques.

6. The system (110) as claimed in claim 5, wherein the one or more secondary techniques comprise at least one of: a dynamic time warping (DTW) or an automatic speech recognition (ASR) technique.

7. The system (110) as claimed in claim 1, wherein the processor (202) is configured to compute a Euclidean distance at corresponding locations in the at least two images and determine the visual variation based on the computed Euclidean distance.

8. The system (110) as claimed in claim 1, wherein the processor (202) is configured to encode the transcript via at least one of: a document to vector (Doc2Vec) technique and a word to vector (Word2Vec) technique.

9. A method for generating content-based time stamps, the method comprising:

receiving, by a processor (202), a set of images via a computing device (104), wherein the received set of images are based on a recorded input;

determining, by the processor (202), a visual variation between at least two images of the set of images and enabling a timestamp on each image of the at least two images based on the recorded input;

integrating, by the processor (202), at least an audio frame with an image of the at least two images based on the visual variation exceeding a threshold value;

mapping, by the processor (202), a text in said at least audio frame based on the integration of said at least audio frame with the image for generating a transcript; and encoding, by the processor (202), the transcript with a plurality of time stamps and determining a correlation between one or more sections in the encoded transcript.

10. The method as claimed in claim 9, comprising determining, by the processor (202), the correlation between the one or more sections and generating one or more vectors using one or more primary techniques.

11. The method as claimed in claim 10, comprising using, by the processor (202), a cosine similarity technique as the one or more primary techniques and merging the one or more sections based on the generated one or more vectors.

12. The method as claimed in claim 11, comprising generating, by the processor (202), a text summary based on the merged one or more sections and labelling the merged one or more sections with the plurality of timestamps.

13. The method as claimed in claim 9, comprising generating, by the processor (202), the transcript using one or more secondary techniques.

14. The method as claimed in claim 9, comprising computing, by the processor (202), a Euclidean distance at corresponding locations in the at least two images and determining the visual variation based on the computed Euclidean distance.

15. A user equipment (UE) (104) for generating content-based time stamps, the UE (104) comprising:

one or more processors communicatively coupled to a processor (202) in a system (110), wherein the one or more processors are coupled with a memory, and wherein said memory stores instructions, which when executed by the one or more processors, cause the one or more processors to:

transmit a set of images to the processor (202) via a network (106), wherein the processor (202) is configured to:

receive the set of images from the UE (104), wherein the received set of images are based on a recorded input;

determine a visual variation between at least two images of the set of images and enable a timestamp on each image of the at least two images based on the recorded input;

integrate at least an audio frame with an image of the at least two images based on the visual variation exceeding a threshold value;

map a text in said at least audio frame based on the integration of said at least audio frame with the image to generate a transcript; and encode the transcript with a plurality of time stamps and determine a correlation between one or more sections in the encoded transcript.

16. A non-transitory computer readable medium comprising a processor with executable instructions, causing the processor to:

receive a set of images from a computing device (104) via a network (106), wherein a user (102) operates the computing device (104), and wherein the received set of images are based on a recorded input;

determine a visual variation between at least two images of the set of images and enable a timestamp on each image of the at least two images based on the received recorded input;

integrate at least an audio frame with an image of the at least two images based on the visual variation exceeding a threshold value;

map a text in said at least audio frame based on the integration of said at least audio frame with the image to generate a transcript; and encode the transcript with a plurality of time stamps and determine a correlation between one or more sections in the encoded transcript.

\* \* \* \* \*